United States Patent [19]

Bornengo et al.

[11] Patent Number: 5,138,047
[45] Date of Patent: Aug. 11, 1992

[54] CATALYTIC PROCESS FOR THE MANUFACTURE OF COPPER PHTHALOCYANINE

[75] Inventors: Giorgio Bornengo; Giovanni Agnes, both of Novara; Augusto Menconi, Crema; Giorgio Bottaccio, Novara; Zafferino Bozzolasco, Saliceto; Danilo Domenis, Saronno, all of Italy

[73] Assignee: ACNA Chimica Organica S.P.A., Italy

[21] Appl. No.: 623,134

[22] Filed: Dec. 6, 1990

[30] Foreign Application Priority Data

Dec. 6, 1989 [IT] Italy .................................. 22640 A/89

[51] Int. Cl.$^5$ ..................... C07D 487/22; C09B 47/06
[52] U.S. Cl. ..................................................... 540/144
[58] Field of Search .......................................... 540/144

[56] References Cited

U.S. PATENT DOCUMENTS 4,104,277  8/1978  Langley .............................. 540/144
4,785,091  11/1988  Fujita et al. ........................ 540/144
4,907,747  3/1990  Segawa .............................. 540/144

OTHER PUBLICATIONS

Gemzova, Chem Abs 109, 94751q (1988).
Harper, Chem Abs 78, 99202n (1972).

*Primary Examiner*—Mark L. Berch
*Attorney, Agent, or Firm*—Morgan & Finnegan

[57] ABSTRACT

This invention relates to improved catalytic process for the manufacture of copper phthalocyanine by allowing phthalic anhydride to react with urea and a copper compound, in the presence of a hydrophobic liquid (dispersing agent), characterized by the presence, along with the catalyst and the dispersing agent, of a promoter selected from particular classes of amides, imides, ureas, thioureas, guanidines, amines or sulphoxides.

17 Claims, No Drawings

CATALYTIC PROCESS FOR THE MANUFACTURE OF COPPER PHTHALOCYANINE

FIELD OF THE INVENTION

The invention relates to an improved catalytic process for the manufacture of copper phthalocyanine in the beta crystalline form, by permitting phthalic anhydride to react with urea and a copper compound; this phthalocyanine is a well known dyestuff, used, for example, in the field of photography, inks and pigmentation of plastic materials.

BACKGROUND OF THE INVENTION

The catalyst, as known, is generally selected from compounds of molybdenum or vanadium and (optionally) phosphorus, for instance $MoO_3$, $(NH_4)_2MoO_4$, ammonium phosphomolybdate etc. The process can be a dry process, namely in the absence of liquids, as described in U.S. Pat. No. 4,118,391, or in the presence of a hydrophobic organic compound (see UK Patent 1 533 354 and Japanese Patent Publication 81-43 357), which disperses and/or partially dissolves the reaction mixture. The above mentioned techniques permit obtaining high yields, a high purity degree and good pigmentation characteristics, but show some not neglectable drawbacks. In fact, they require high reaction temperatures and long contact times. These drawbacks are very deleterious not only as to the high energy cost, but also as to the negative impact of the high temperature on organic products. In fact, these last degrade although in a low percentage, at temperatures greater than 200° C., giving rise, in some cases, to by-products which change the chromatic tone of the phthalocyanine. Furthermore, the "dry" method requires particular delicate and sophisticated apparatus, especially when a continuous production (requiring a strict control of temperatures and times) is performed. Processes performed at temperatures greater than 180° C. are particularly harmful when the dispersing agent is trichrlorgenzene, as it usually happens on a large scale. In fact, it is known that at high temperatures the reaction mixture (urea+phthalic anhydride+copper or copper compound) causes a degradation of trichlorobenzene, thus forming polychlorodiphenyls, very toxic and difficult to be removed from the finished product.

The Applicants have now found that a particular class of promoters diminish remarkably (and without any drawback) these temperatures and at the same time increase the reaction rate.

In particular, Applicants noted that the reduction of times and temperatures drastically reduces the formation of the degradation products. This is particularly important if the dispersing medium is trichlorobenzene or dichlorobenzene. In fact, in this case, a lowering of the reaction temperatures involves a drastic reduction of polychlorodiphenyls, which originate from the above mentioned solvents. Also Japanese Patent Publication 77-052 927 teaches to reduce the temperature (thus saving energy and reducing polychlorobenzenes) by adding, besides the catalyst, suitable amounts of caustic soda. However, this method is unsatisfactory because of the high ecologic risk connected with the heating of trichlorobenzenes in the presence of caustic soda, which may trigger a strong reaction and consequent uncontrollable production of dioxinic pollution.

DISCLOSURE

In its broadest aspect, the invention relates to an improved catalytic process for the production of copper phthalocyanine in the beta crystalline form, by permitting phthalic anhydride to react with urea and copper (or a copper compound), in the presence of a hydrophobic liquid (dispersing agent), characterized by the presence, along with the catalyst and the dispersing agent, of a promoter selected from:

A) Amides, imides, ureas, thioureas and guanidines of general formula (I), (II) or (III)

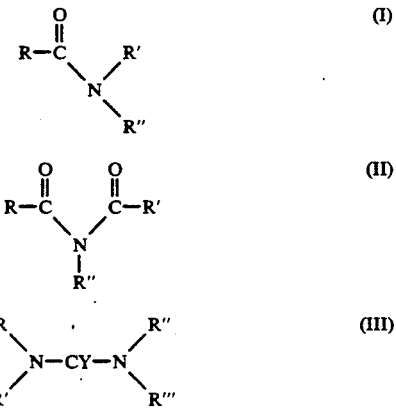

wherein Y is S, NH or O and R, R', R" and R'|, the same or difference, are alkyl or alkenyl (in particular alkylvinyl), aryl or cycloaliphatic containing from 1 to 15 C atoms, the groups of couples (R+R') and (R+R"), respectively, being optionally bound among each other, as to give a carbocyclic or heterocyclic ring.

B) Sulfoxides of general formula (V):

wherein R and R' have the above mentioned meaning; the amount of promoters being in the range of from 5 to 100 mols per 100 mols of copper or copper compound.

The amounts of phthalic anhydride, urea, copper, dispersing agent and catalyst are reported in details in UK Pat. 1533 354 as well as in Japanese Patent Publications 81043 357 and 77-52927. Generally, the following values can be used:

copper (or copper compound): between 10 and 30% by mols on the phthalic anhydride;

urea: between 200 and 600% by mols on the phthalic anhydride;

catalyst: between 100 and 5000 ppm, on the phthalic anhydride;

dispersing agent: between 150 and 1000% by weight, on the phthalic anhydride.

Some advantages which arise from the present invention are mentioned below:

selected promoters permit performing the synthesis at lower temperatures and/or within reduced times, thus improving the color tone of the phthalocyanine and reducing the formation of undesired by-products;

the synthesis can be performed in the presence of low-boiling dispersing agents such as chlorobenzene, trichlorobenzenes (for example mesitylene); tert.butyl benzene; tert.butyl toluene; 2-chloro-paraxylene and other dispersing agents which, because of their low boiling point, cannot be used in high temperature processes of the generally used type (or requiring an expensive apparatus which can withstand pressure).

The copper compound, which has to react with phthalic anhydride and urea, is generally selected from $Cu_2O$, CuO, copper phosphate, CuX or $CuX_2$ wherein X is selected from Cl, Br, I, OH, $HSO_4$, $SO_4$, $NO_3$, $CH_3COO$ etc., according to the copper valence; obviously, copper acetate can be replaced by other copper carboxylates, such as copper benzoate, naphthenate, 2-ethylhexanoate, n-octanoate, sebacate, phthalate etc.

The synthesis temperature, owing to the action of promoters, can be very low (110° C.) indeed; generally temperatures between 110° and 170° C., preferably between 130° and 170° C. (and still better between 145° and 170° C.) can be used, the reaction time being usually equal or higher than 2 hours. The heating is performed under agitation and the promoter can be added either at the start of the synthesis reaction or during the reaction, that is while heating the reaction mixture. The chromatographic analysis proved that the promoters according to the invention remain substantially unchanged until the reaction is completed. Therefore, they can be recovered and recycled without prejudice to their effectiveness, through filtration, distillation (or extraction) operations, according to usual procedures, known to anyone skilled in the art.

Particularly advantageous promoters have been proved to be N,N,N',N'-tetramethylurea and/or thiourea; N-methyl-2-pyrrolidone; 1,3-dimethyl-2-imidazolidone; N,N-dimethyl-acetamide; 1,1,3,3-tetramethyl-guanidine; dimethylsulfoxide; di-ethylsulfoxide. Abbrevations of promoters, reported in the examples, have the following meanings:
TMU=N,N,N'N'-tetramethylurea;
NMP=N-methyl-2-pyrrolidone; TMTU=N,N,N',N'-tetramethylthiourea
DMI=1,3-dimethyl-2-imidazolidone; TMG=1,1,3,3-tetramethyl-guanidine
DMA=N,N-dimethylacetamide
Formulae of some promoters follow:
-N-methyl-2-pyrrolidone (NMP):

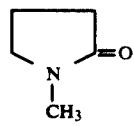

-1,3-dimethyl-2-imidazolidone (DMI):

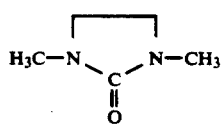

The hydrophobic dispersing agent can be selected from trichlorobenzene; dichlorobenzene; dichlorotoluenes; 2-chloroparaxylene; nitrobenzene; alkyl-benzenes (for instance mesitylene, 4-tert.butyl toluene; 1,3-diisopropylbenzene); diphenyl; diphenylether; polychloroalkanes, polychloroalkenes (for instance hexachlorobutadiene); alpha and/or beta methylnaphthalene; tetrahydronaphthalene; decahydronaphthalene; quinoline and mixtures thereof. The catalyst may be selected from a lot of compounds; in particular we mention: $MoO_3$; $(NH_4)_2MoO_4$; ammonium phosphomolybdate, $WO_3$, ammonium tungstate, ammonium phosphotungstate, ammonium isopolytungstate and ammonium hetero-polytungstate.

Furthermore, it is possible to use, along with catalyst and promoter, a modifier, for instance tetrahydrophthalic anhydride (or derivatives thereof), a tetrahydrophthalimide (or derivatives thereof), a sulfonic derivative of phthalic anhydride (or of phthalimide or of copper phthalocyanine itself), or one of other agents described in European Patent 266 219, the content of which is integrating part of the present description.

As known, a modifier of this type involves a better machineability of phthalocyanine crystals to be ground, a better chromatic tone and a better moldability.

EXAMPLES

The following examples have a merely illustrative purpose and do not limit in any way the scope of the present invention.

EXAMPLE 1

Into a 250 $cm^3$ flask, provided with blade agitator, thermometer, cooler and external heating bath, there were introduced in the order:
40.5 g urea
29.92 g phthalic anhydride
1.2 g N,N,N',N'-tetramethylurea
0.155 g molybdic anhydride
4.72 g CuCl (technical grade)
108 g technical grade trichlorobzeen The mass was brought to 170° C. in 90 minutes while stirring and was then kept at 170° C. for 5 h.

Thereafter, the volatile portion was distilled off (16 50 mmHg), while keeping the temperature of the external bath at 150° C. The residue was digested (at 90° C. for 2 h, under stirring with 560 g of an aqueous solution of $H_2SO_4$ (10% b.w.). The filtrate, dried in an oven at 100° C. for 24 h, consisted of 26.4 g of phthalocyanine in the beta crystalline form.

Yield on CuCl=96.1%

EXAMPLE 2 (COMPARISON EXAMPLE)

Into the same apparatus used in example 1 a test was carried out according the same modalities, using the same amounts of reactants, excepting N,N,N',N'-tetramethylurea, which was omitted.

From the ron reaction product, treated as in example 1, only 2 g of copper phthalocyanine were obtained.
Yield on CuCl=8.0%

EXAMPLE 3 (TEST WITH N-METHYL-2-PYRROLIDONE)

Into the apparatus of example 1 were introduced:
40.5 g urea
29.92 g phthalic anhydride
2 g N-methyl-2 pyrrolidone
0.155 g molybdic anhydride
4.72 g CuCl (technical grade)
108 g trichlorobenzene (technical grade)

By working as in example 1, 26.4 g of copper phthalocyanine in crystalline form (beta) were obtained; yield on the used CuCl=96.1%.

EXAMPLE 4

Example 1 was repeated, by omitting the addition of fresh N,N,N',N'-tetramethylurea and using the mixture of volatile products obtained from the distillation of example 1 (containing TMU) instead of technical trichlorobenzene. By working always as in example 1, 26.4 g of copper phthalocyanine were obtained.

This test proves that tetramethylurea can be used again in subsequent tests, in that it remains practically unchanged during the test and for the most part it is distilled off along with the dispersing agent in the final post-treatment. Data and results are reported in Table I.

TABLE I

| EX. | T °C. | t (h) | Promoter | Yield on copper |
|---|---|---|---|---|
| 1 | 170 | 5 | N,N,N',N'-tetramethylurea | 96.1% |
| 2* | 170 | 5 | — | 8.0% |
| 3 | 170 | 5 | N-methyl-2-pyrrolidone | 96.1% |
| 4 | 170 | 5 | TMU (contained in the recycle of example 1) | Substantially as in Example 1 |

*Comparison example

EXAMPLE 5

| | |
|---|---|
| 27 g urea | 19.95 g phthalic anhydride |
| 0.8 g TMU | 0.105 g molybdic anhydride |
| 2.13 g copper (metallic, powder) | |
| 72 g technical grade trichlorobenzene (mixture of isomers) | | were introduced in the above order into the reactor of example 1. The reaction mixture was heated from 20° to 170° C. in 90 minutes while stirring and was then kept at 170° C. for 5 h. The volatile portion was distilled off under vacuum (50 mmHg) by keeping the temperature of the bath at about 150° C.

The residue was digested as in example 1; The filtrate, dried in an oven at 100° C. for 24 h, consisted of 17.3 g of copper phthalocyanine in the beta crystalline form. The yield on copper was 89.6%.

EXAMPLES 6-13

Example 5 was repeated by changing the copper source, the promoter, temperatures and times, as indicated in Table II, which reports also the obtained results.

EXAMPLE 14

| | |
|---|---|
| 27 g urea | 19.95 g phthalic anhydride |
| 0.8 g TMU | 0.105 g molybdic anhydride |
| 3.15 g cuprous chloride | 50 cm$^3$ mesitylene | were introduced in this order into the reactor of example 1. The reaction mixture was heated from 20° to 155° C. in 3 h, while stirring and was then kept at 155° C. for 8 hour. The volatile portion was distilled off under vacuum (50 mmHg) while keeping the temperature of the bath at about 150° C. The residue was digested as in example 1. The filtrate, dried in an oven at 100° C. for 24 h, consisted of 16.2 g of copper phthalocyanine in the beta crystalline form. The yield on the copper was 88.5%

EXAMPLES 15-20

Example 14 was repeated changing dispersing agent, promoter, temperatures and times as indicated in Table III, which reports also the obtained results.

EXAMPLE 21

| | |
|---|---|
| 40.5 g urea | 29.92 g phthalic anhydride |
| 2.0 g NMP | 0.155 g molybdic anhydride |
| 4.72 g cuprous chloride | |

75 cm$^3$ of a mixture (50/50) of alpha- and beta-methylnaphthalene were introduced, in the above order, into the reactor of example 1. The reaction mixture was heated from 25° to 170° C. in 2 h, under stirring, and was kept at 170° C. for 4 h. The volatile portion was distilled off under vacuum (50 mmHg) while keeping the temperature of the bath at about 150° C. The residue was digested as in example 1. The filtrate, dried in an oven at 100° C. for 24 h, consisted of 26.2 g of copper phthalocyanine in the crystalline beta form. The yield on copper was 95.4%

EXAMPLES 22 AND 23

Example 21 was repeated by changing dispersing agent, promoter, temperatures and times, as indicated in table IV, which reports also the obtained results.

TABLE II

| EXAMPLE | SOURCE OF COPPER (g) | PROMOTER (g) | TIMES Ist STEP | TIMES IInd STEP | PHTHALOCYANINE (g) | YIELD ON Cu (%) |
|---|---|---|---|---|---|---|
| 5 | Metal Cu (2.13) | TMU (0.8) | from 20 t 170° C. in 90 min. | 170° C. for 5 h | 17.3 | 89.6 |
| 6 | Cu$_2$O (2.38) | TMU (0.8) | as in ex. 5 | 170° C. for 7 h | 18.3 | 95.8 |
| 7 | CuCl (3.30) | DMI (0.8) | from 20 to 145° C. in 2 h | 145° C. for 8 h | 17.4 | 90.6 |
| 8 | CuCl (3.30) | TMU (0.2) | as in ex. 7 | 145° C. for 8 h | 18.0 | 93.7 |
| 11 | CuCl (3.30) | TMTU (0.8) | from 20 to 160° C. in 4 h | 160° C. for 6 h | 17.0 | 88.0 |
| 12 | CuCl (3.30) | TMG (0.8) | from 20 to 145° C. in 3 h | 145° C. for 7 h | 17.3 | 90.1 |

(*) COMPARISON EXAMPLE

TABLE III

| EXAMPLE | DISPERSING AGENT (cm³) | PROMOTER (g) | TIMES Ist STEP | TIMES IInd STEP | PHTHALO-CYANINE (g) | YIELD ON Cu (%) |
|---|---|---|---|---|---|---|
| 14 | Mesitylene (50) | TMU (0.8) | from 20 to 155° C. in 3 h | 155° C. for 8 h | 16.2 | 88.5 |
| 15(*) | Mesitylene (50) | — | as in ex. 14 | as in ex. 14 | 0 | 0 |
| 16 | 4-tert.butyl-toluene (50) | NMP (1.6) | from 20 to 165° C. in 2 h | 165° C. for 5 h | 17.35 | 94.8 |
| 17(*) | 4-tert.butyl-toluene | — | as in ex. 16 | as in ex. 16 | 0 | 0 |
| 18 | 1,3-diiso-propylben-zene (50) | NMP (1.6) | as in ex. 16 | as in ex. 16 | 17.1 | 93.4 |
| 19(*) | as in ex. 18 | — | as in ex. 18 | as in ex. 18 | 0 | 0 |
| 20 | hexachloro-butadiene (50) | NMP (1.6) | from 20 to 170° C. in 2 h | 170° C. for 5 h | 17.2 | 93.9 |

(*) COMPARISON

TABLE IV

| EXAMPLE | DISPERSING AGENT (cm³) | PROMOTER (g) | TIMES Ist STEP | TIMES IInd STEP | PHTHALO-CYANINE | YIELD ON Cu (%) |
|---|---|---|---|---|---|---|
| 21 | methyl-naph-thalene (75) | NMP (2) | from 25 to 170° C. within 2 h | 170° C. for 4 h | 26.2 | 95.4 |
| 22 | 2-chloro-pa-raxylene (75) | NMP (2) | from 25 to 165° C. within 4 h | 165° C. for 6 h | 26.3 | 95.7 |
| 23 | 2-chloro-pa-raxylene (75) | TMU (1.2) | as in ex. 22 | as in ex. 22 | 26.5 | 96.5 |

What we claim is:

1. A catalytic process for the manufacture of copper phthalocyanine, in the beta crystalline form, comprising,
   1) reacting phthalic anhydride with urea and copper or a copper compound at a temperature between about 110° C. and 170° C.,
   2) conducting said reaction in the presence of
      a) a catalyst,
      b) a hydrophobic liquid as a dispersing agent,
      c) a promoter being selected from:
         A) amides, imides, ureas, thioureas and guanidines, of formula (I), (II) or (III):

(I)

(II)

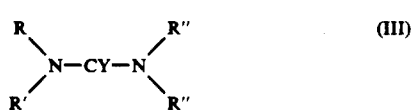

(III)

wherein Y is S, NH or O and R, R', R", and R''', the same or different, are alkyl or alkenyl, selected from the group consisting of alkylvinyl, aryl or cycloaliphatic groups, containing from 1 to 15 carbon atoms, the groups R and R" being optionally bound between each other to form a carbocyclic ring;

B) sulfoxides of formula (IV):

(IV)

wherein R and R' have the above specified meaning; the amount of promoter being between 5 and 100 mols per 100 mols of copper or copper compound.

2. A process according to claim 1, wherein the copper compound which has to react with the phthalic anhydride and urea is selected from Cu₂O, CuO, copper phosphate, CuX or CuX₂, X being selected from Cl, Br, I, OH, HSO₄, SO₄, NO₃ and carboxylic anions according to the copper valence.

3. A catalytic process for the manufacture of copper phthalocyanine, in the beta crystalline form, according to claim 1 wherein the reaction temperature is between 130° C. and 170° C.

4. A process according to claim 1, wherein heating is performed under stirring, the promoter being added either at the start of the reaction or during the reaction, namely while heating the reaction mixture.

5. A process according to claim 1, wherein the promoters are recovered and recycled by filtration, distillation or extraction.

6. A catalytic process for the manufacture of copper phthalocyanine, in the beta crystalline form, comprising,
   1) reacting phthalic anhydride with urea and copper or a copper compound at a temperature between about 110° C. and 170° C.,
   2) conducting said reaction in the presence of a) a catalyst,
b) a hydrophobic liquid as a dispersing agent,
c) a promoter, wherein
    said promoter is selected from N,N,N', N'-tetramethyl-urea and/or thiourea; N-methyl-2-pyrrolidone; 1,3 dimethyl-2-imidazolidone; N,N-dimethyl-acetamide; 1,1,3,3-tetramethyl-guanidine; dimethyl-sulfoxide, diethyl-sulfoxide and mixtures thereof and the amount of promoter being between 5 and 100 mols per 100 mols of copper or copper compound.

7. A process according to claim 1 wherein the hydrophobic dispersing agent is selected from alkyl-benzines, selected from the group consisting of toluene tert.butyl-benzene, tert.hexyl-benzene; polyalkylbenzenes, selected from the group consisting of mesitylene, 4-tert.-butyl-toluene, 1,3-diisopropyl-benzene; diphenyl; diphenylether; alpha and/or beta-methyl-naphthalene; tetrahydronaphthalene, decahydronaphthalene, quinoline and mixtures thereof.

8. A process according to claim 1 wherein the hydrophobic dispersing agent is selected from trichlorobenzene; dichlorobenzene; dichlorotoluenes; 2-chloro-para-xylene; nitrobenzene; polychloroalkanes and polychloroalkenes.

9. A process according to claim 1 wherein the catalyst is selected from the compounds of molybdenum and/or tungsten and optionally phosphorus.

10. A process according to claim 9, wherein the catalyst is selected from $MoO_3$; $(NH_4)_2MoO_4$; ammonium phpsphomolybdate; ammonium isopolymolybdate; ammonium hetero-polymolybdate; $WO_3$; ammonium phosphotungstate; ammonium tungstate; ammonium isopolytungstate and ammonium hetero-polytungstate.

11. A process according to claim 1, wherein the following amounts of reactants and catalyst are used;
    copper (or copper compound): between 10 and 30% by mols on the phthalic anhydride;
    urea: between 200 and 600% by mols, on the phthalic anhydride;
    catalyst: between 100 and 5000 ppm, on the phthalic ahhydride;
    dispersing agent: between 150 and 1000% by weight, on the phthalic anhydride.

12. A process for the manufacture of copper phthalocyanine, in the beta crystalline form, by reaction at 145°–170° C. of phthalic anhydride with urea and cuprous chloride, CuCl, in the presence of a hydrophobic liquid, dispersing agent, in the presence of a molybdenum and/or tungsten compound, as the catalyst, and in the presence of a promoter selected from N-methyl-2-pyrrolidone and tetramethylurea, the amount of the promoter being from 5 to 100 mols per 100 mols of CuCl.

13. A process according to claim 12, wherein the catalyst is selected from $MoO_3$, ammonium molybdate, ammonium phosphomolybdate, ammonium isopolymolybdate and ammonium heteropolymolybdate.

14. A process according to claim 12, wherein the catalyst is selected from $WO_3$, ammonium tugnstate, ammonium phosphotugnstate, ammonium isopolytungstate and ammonium heteropolytungstate.

15. A process according to claim 2, wherein the carboxylic anion is $CH_3COO$.

16. A process according to claim 6, wherein the reaction temperature is between 130° and 170° C.

17. A process according to claim 3, wherein the reaction temperature is between 145° and 170° C.

* * * * *